United States Patent
Anders et al.

(10) Patent No.: US 9,181,682 B2
(45) Date of Patent: Nov. 10, 2015

(54) AGGRESSIVE AND STABLE SPEED CONTROL

(71) Applicant: Caterpillar Inc., Peoria, IL (US)

(72) Inventors: Jonathan W. Anders, Peoria, IN (US); Brian D. Kuras, East Peoria, IL (US); Adam M. Nackers, East Peoria, IL (US); Christopher P. Braet, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 146 days.

(21) Appl. No.: 13/868,790

(22) Filed: Apr. 23, 2013

(65) Prior Publication Data

US 2014/0316664 A1  Oct. 23, 2014

(51) Int. Cl.
| | |
|---|---|
| *E02F 9/20* | (2006.01) |
| *G05B 13/02* | (2006.01) |
| *G05B 11/42* | (2006.01) |
| *E02F 9/12* | (2006.01) |
| *E02F 9/22* | (2006.01) |

(52) U.S. Cl.
CPC ............. *E02F 9/2058* (2013.01); *E02F 9/123* (2013.01); *E02F 9/2095* (2013.01); *E02F 9/2253* (2013.01); *G05B 11/42* (2013.01); *G05B 13/02* (2013.01)

(58) Field of Classification Search
None
See application file for complete search history.

(56) References Cited

U.S. PATENT DOCUMENTS

| | | | |
|---|---|---|---|
| 7,772,792 B2 | 8/2010 | Kawaguchi et al. | |
| 2008/0164832 A1* | 7/2008 | Kawaguchi et al. | 318/456 |
| 2008/0249691 A1 | 10/2008 | Kawaguchi et al. | |
| 2009/0055056 A1 | 2/2009 | Ooki et al. | |
| 2012/0283919 A1 | 11/2012 | Kuras et al. | |

* cited by examiner

*Primary Examiner* — Mussa A Shaawat
(74) *Attorney, Agent, or Firm* — Miller, Matthias & Hull LLP (57) ABSTRACT

A system and method are provided for controlling a movable element in accordance with a speed command. The movable element, which may be an excavator swing platform, is moved via an actuator that is driven in accordance with a torque command. The speed of the movable element is sensed, and a torque command is generated via PID control based on the speed command and the sensed speed. The PID control uses a set of gains including a P-gain, an I-gain, and a D-gain. At least one of these gains is set based on a counter, and the counter is set, cleared, incremented, or decremented based on one or more of the speed command, the torque command and the sensed speed. In this way, the movable element responds aggressively to operator input, but stability is maintained.

18 Claims, 5 Drawing Sheets

AGGRESSIVE AND STABLE SPEED CONTROL

TECHNICAL FIELD OF THE DISCLOSURE

The present disclosure relates to speed control and, more particularly, relates to a system and method for providing aggressive speed control without inducing instability in the controlled entity.

BACKGROUND OF THE DISCLOSURE

Closed loop control is often used to manage the speed of machine transmission outputs, excavator swing platforms, and other speed-controlled machine elements. In general terms, such closed loop control operates by minimizing a difference between a desired speed and an actual speed of the element in question. In particular, the actual speed of the controlled entity is fed back to a controller which implements a PID (proportional-integral-derivative) process to derive a torque or torque command, which, when applied, will reduce the difference between the actual speed and the desired speed.

The controller will typically use three parameters to control the gain on the proportional, integral, and derivative stages respectively. While higher gains initially result in a more rapid response to speed change inputs, the gains needed to provide sufficient responsiveness often result in instability such as continuous overshooting or ringing. These problems are exacerbated in systems having inherent mechanical backlash and/or significant communication or processing delays. Thus, a stable speed control algorithm for such a system typically requires more subdued gains to yield a stable system. However, while stability can be achieved, the resultant system is often sluggish in responding to operator control inputs. This can lead to operator impatience and dissatisfaction, and in some cases, may also result in operator errors and inefficiencies.

With respect to the conversion of the swing function of excavator machines from hydraulic drive to electric drive, the modification of the electric motor function to replicate the behavior of a hydraulic swing function has been addressed in at least one reference. See, for example, US Patent Application 20120283919, entitled "Electric Swing Drive Control System and Method." In that application, the problem of braking the swing platform using the electric drive is discussed, and a method is disclosed for braking the swing motion at a substantially constant rate when a command signal indicates zero desired swing speed. However, this technique does not address the need to provide responsive behavior during an increase in swing speed.

The present disclosure is directed to a system that may exhibit numerous distinctions over prior systems. However, it should be appreciated that any such distinction is not a limitation on the scope of the disclosed principles or of the attached claims except to the extent expressly noted. Additionally, the discussion of any problem or solution in this Background section is not an indication that the problem or solution represents known prior art. For readers interested in a full and accurate understanding of the underlying feedback control theory and its limitations, numerous volumes on the subject are publicly available. This Background section is also too brief to fully and accurately describe the referenced patent application, and as such, the above characterization of the application is not itself prior art. Interested reads are referred to the application itself.

SUMMARY OF THE DISCLOSURE

In accordance with one aspect of the present disclosure, a speed control system for controlling a movable element in keeping with a speed command is provided. Control of the movable element is via an actuator responsive to a torque command, and the speed control system includes a speed command input for receiving the speed command, a torque output for outputting the torque command, and a speed input for receiving a sensed speed of the movable element. A PID control module is configured to convert the speed command to the torque command through a PID control applying a set of gains including a P-gain, I-gain, and D-gain. A gain scheduler is configured to increment or decrement a counter based on logic or an algorithm using at least one of the speed command, the torque command and the sensed speed, and to provide at least one gain to the PID control module based on a value of the counter.

In accordance with another aspect of the present disclosure, an excavator is provided having a speed-controlled swing platform. A speed sensor produces a signal indicative of sensed platform speed, an electric motor drives the swing platform and an operator control provides a speed command to operate the swing platform. A controller is configured to receive the speed command and the sensed speed and to generate a torque command to drive the electric motor based on the speed command and the sensed speed. In particular, a PID control module associated with the controller is configured to convert the speed error (the difference between the speed command and the sensed speed) to the torque command through PID control applying a set of gains including a P-gain, I-gain, and D-gain, and a gain scheduler associated with the controller is configured to increment or decrement a counter based on logic or an algorithm using at least one of the speed command, the torque command and the sensed speed, and to provide at least one gain to the PID control module based on a value of the counter.

In accordance with yet another aspect of the present disclosure, a method of speed control for controlling a movable element in accordance with a speed command is provided. Control of the movable element is via an actuator responsive to a torque command. The method includes receiving the speed command, generating a sensed speed of the movable element, and providing a torque output to the actuator via PID control based on the speed command and the sensed speed. The PID control uses a set of gains including a P-gain, an I-gain, and a D-gain. At least one of these gains is set based on a counter, wherein the counter is set, cleared, incremented, or decremented based on logic or an algorithm using one or more of the speed command, the torque command and the sensed speed.

Other features and advantages of the disclosed systems and principles will become apparent from reading the following detailed disclosure in conjunction with the included drawing figures.

DETAILED DESCRIPTION OF THE DISCLOSURE

The present disclosure provides a system and method for controlling a movable element such as an excavator swing platform with aggressive but stable response to operator inputs in accordance with a speed command. The movable element, which may be an excavator swing platform, is moved via an actuator, such as an electric motor, that is driven in accordance with a torque command. The speed of the movable element is sensed, and a torque command is generated via PID control based on the speed command and the sensed speed. The PID control employs a set of gains including a P-gain, an I-gain, and a D-gain. At least one of these gains is set based on a counter, and the counter is set, cleared, incremented, or decremented based on one or more of the speed command, the torque command and the sensed speed. In this way, the movable element responds aggressively to operator input, but stability is maintained when reaching a steady state speed.

Having discussed various embodiments in overview, we turn now to detailed descriptions of certain embodiments. As noted above, the described system and method are applicable to any machine wherein a torque-driven actuator, such as an electric motor, is controlled to respond to a speed request input, such as in an electric swing platform. It will be appreciated that although the electric swing platform of an excavator machine is used as an example herein, the uses of the disclosed principles are not limited to this particular environment. Other environments include implement drive, machine drive, industrial equipment drive or actuation, and so on. Machines may include, without limitation, earth-moving machines, such as wheel loaders, excavators, dump trucks, backhoes, motor graders, material handlers, locomotives, paving machines and so on Implements may include buckets, compactors, forked lifting devices, brushes, grapples, cutters, shears, blades, breakers/hammers, augers, and others.

Figure 1:
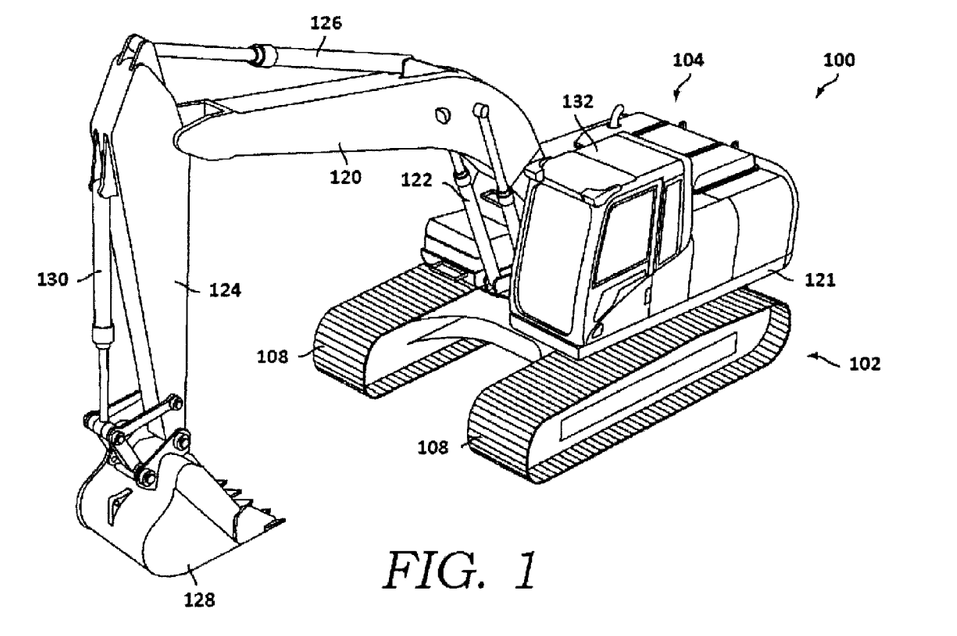
FIG. 1 is a perspective view of an excavator within which the described principles may be implemented.
Figure 2:
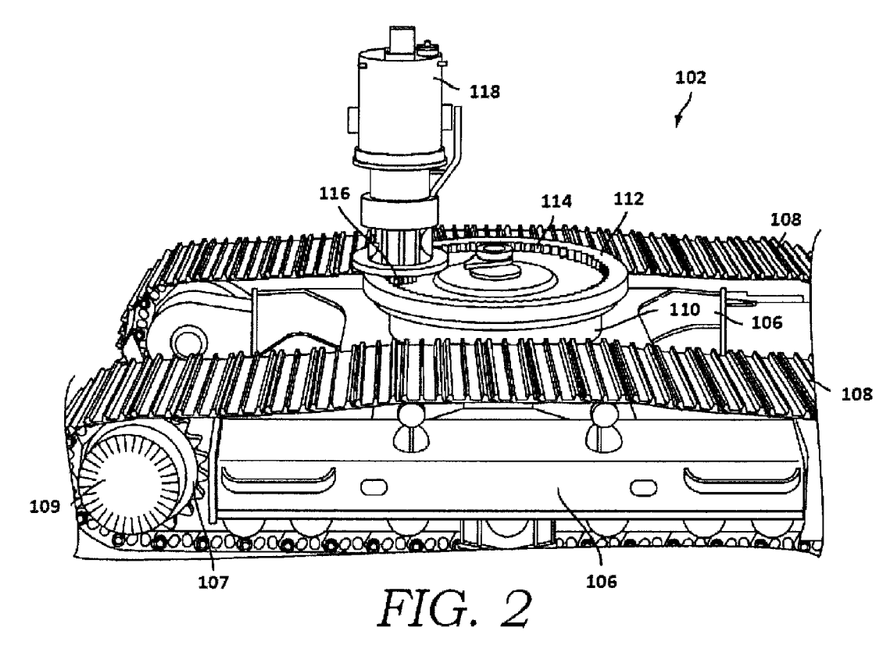
FIG. 2 is a perspective view of an undercarriage of the excavator shown in FIG. 1, showing an electric swing motor having a sprocket engaged with a ring gear of the undercarriage.

FIG. 1 is a perspective view of an excavator within which the described principles may be implemented, while FIG. 2 is a perspective view of an undercarriage of the excavator shown in FIG. 1. The excavator 100 includes an undercarriage 102 and an upper structure 104. The undercarriage 102, which is also shown in FIG. 2, includes a generally H-shaped frame 106 that supports two crawler tracks 108 along its edges and includes a post 110 supporting a ring gear 112 close to its center. The crawler tracks 108 are moved by sprockets 107 that are rotated by hydraulic drive motors or electric drive motors 109 connected to the frame 106. The ring gear 112 includes a plurality of teeth 114 arranged along its inner periphery, which mesh with a drive sprocket 116 powered by a swing motor 118.

In reference to FIG. 2, the swing motor 118 is connected to the upper structure 104 such that rotation of the drive sprocket 116 causes the relative rotation of the upper structure 104 relative to the undercarriage 102. The upper structure 104 includes a boom 120 that is pivotally connected to an upper structure frame 121 and pivoted by use of two boom actuators 122. An arm 124, which is also commonly referred to as a stick, is pivotally connected at an end of the boom 120 and pivoted by an arm actuator 126. A bucket 128 is connected to an end of the arm 124 and pivoted by a bucket actuator 130.

The boom actuators 122, the arm actuator 126 and the bucket actuator 130 are embodied in the illustrations as linear hydraulic cylinders, which are configured to be extended and retracted by selective porting of pressurized fluid on one side of a hydraulic piston. The various functions of the machine 100 may be controlled in part by the appropriate handling of various control devices by an operator occupying a cab 132.

The electrical swing motor 118 receives electric power from any suitable source or combination of sources, including for example, generators, battery banks, capacitor banks, and so on. An onboard engine or other power source may supply rotational power to a generator, hydraulic pump, and any other powered accessory or component.

Figure 3:
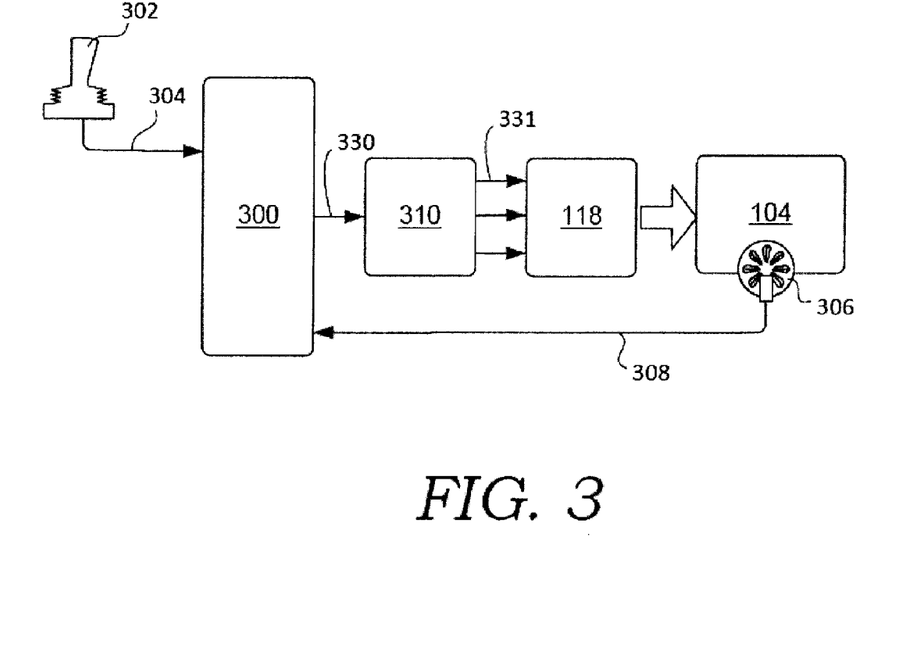
FIG. 3 is a functional diagram showing one illustrative architecture usable for swing control in accordance with the disclosed principles.

Although any suitable arrangement of swing control components may be used within the disclosed principles, FIG. 3 is a functional diagram showing one illustrative architecture usable for the swing control system. A swing controller 300 may be implemented in a single controller or in a plurality of linked controllers, and/or may be implemented as a combination of integrated circuit components and discrete components.

As will be appreciated, a controller is a solid state device having a processor and optionally other resources such as memory, converters and so on to implement one or more control functions. A controller receives one or more signal and/or command inputs, which may be digital or analog, and provides one or more output control signals in keeping with the control process implemented by the controller.

As used herein, controllers are processor based devices that operate by executing computer-executable instructions read from a non-transitory computer-readable medium. The non-transitory computer-readable medium may be any of a hard drive, flash drive, RAM, ROM, optical memory, magnetic memory, and so on. Each controller discussed herein may be implemented as a dedicated controller or may be implemented within an existing controller also serving one or more other functions, e.g., engine or machine speed control.

The swing controller 300 is configured to receive signals indicative of a desired speed and actual speed of the upper structure 104 relative to the undercarriage 102 of the machine 100, as shown in FIG. 1. For example, the swing controller 300 may be connected to an operator control lever 302 via a communication line 304. In an embodiment, the control lever 302 is configured to be displaced by the operator and to provide a control signal indicative of the desired motion of the upper structure 104 relative to the undercarriage 102. The control lever 302 may be positioned within the operator cab 132 (FIG. 1). The lever 302 may generate the control signal by way of one or more transducers, encoders, and so on as desired in any given implementation.

A sensor 306 is configured to generate a signal indicative of the position, direction, speed and/or acceleration of the upper structure 104 relative to the undercarriage 102 (FIG. 1). In an embodiment, the sensor 306 generates a speed signal that indicates, or can be used to derive, a directional speed of the upper structure 104 relative to the undercarriage 102. In another embodiment, the sensor 306 generates a speed signal that indicates, or can be used to derive, a directional speed of the swing motor 118. This speed signal may be passed to the control 300 via a communication line 308.

The controller 300 is configured to provide a torque command for the swing motor 118 via a command line 330 based at least on the control signal from the control lever 302 and the speed signal from the sensor 306. The torque command carried on line 330 is provided to other components and systems of the machine as needed to drive the motor 118, such as one or more inverters, transistors, drivers, etc.

In the illustrated example, a power electronics package 310 receives the torque command carried on line 330 and converts it to a power signal, e.g., a voltage or current signal providing power to the motor 118. The power signal is then conveyed from the power electronics package 310 to the motor 118 via one or more power lines 331. It will be appreciated that the power signal may be a multi-phase signal, and in an embodiment, the power signal is a three-phase power signal. While the voltage and current level of the power signal may vary depending upon the motor, generator, power electronics and the nature of the signal (e.g., PWM or variable level), an example drive voltage may be between 400V and 800V. Finally, as the motor 118 turns, it imparts a rotational motion (swing) to the swing platform 104.

Within the illustrated architecture of FIG. 3, the controller 300 is configured to generate a torque command for the motor 118 as noted above. In particular, since the operator is in essence giving a speed command and the swing motor 118 is driven by a torque command, a closed loop PID control is used to provide response and stability. However, with an ordinary PID system, as the difference or error between the commanded speed and the actual speed drops, the motor torque command also drops. This may result in a stable but sluggish response to operator inputs. If one were to simply increase the gains for the PID, the system would respond much more quickly, but upon settling, the system would ring or oscillate about the desired speed, potentially with increasing rather than decreasing amplitude. This oscillation or potential instability would result in an unsatisfied operator and potentially degraded system/component life.

The stability of the system may be aided by decreasing the ECM execution time of the controller 300 or increasing the sampling rate (100 Hz to 1 kHz), including the sampling of the sensor 306 over line 308 and the commanding of the torque over line 330. However, while increasing the sampling rate may provide some help, it has been found that even a ten-fold increase in the sampling rate did not render more than about a 25% reduction in instability.

In an embodiment, the controller 300 is configured to execute a modified and supplemented PID process to provide much more aggressive speed control of the swing motor 118 while maintaining system stability. In overview, the controller 300 executes this control scheme by providing increased control gains to improve response during operator requested transient events, while reducing the control gain under certain conditions, and incrementally increasing or resetting the control gain under other conditions.

Figure 4:
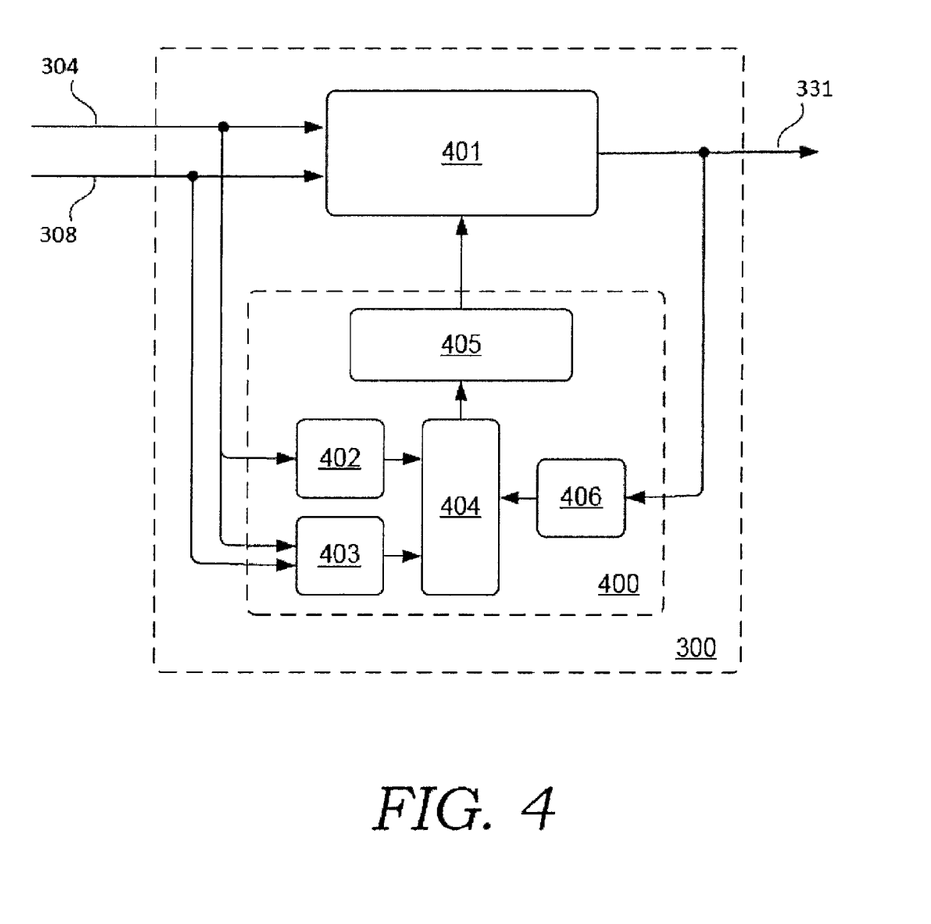
FIG. 4 is a controller logical architecture for implementing embodiments of the disclosed principles.

A controller logical architecture in keeping with this technique is shown in FIG. 4. In the illustrated embodiment, the controller 300 implements a gain modifier 400 in conjunction with the PID module 401. The gain modifier 400 provides an initially large gain to the PID for rapid system response, but reduces the gain based on a number of factors as described in greater detail below to maintain system stability.

The PID module 401 receives as input the actual speed of the swing platform, e.g., as provided by the sensor 306, and the desired speed of the platform as indicated by operator input, e.g., via the operator control lever 302. The PID module 401 executes a PID process to derive a torque command for driving the swing motor 118. In executing the PID process, the PID module bases its calculations on the input data and on one or more gains provided by the gain modifier 400.

The gain modifier 400 comprises a number of components or modules, including a movement analyzer 402, a crossing detector 403, a counter 404, and a gain scheduler 405. The gain scheduler 405 receives a count value from the counter 404 and provides a gain output to the PID module 401. The gain scheduler 405 is configured such that the gain output provided to the PID module 401 indicates a gain that is inversely related to the count value. That is, the higher the count value, the lower the gain indicated by the gain output and used by the PID module 401. Thus, a low count value yields high gains, while a higher count value yields lower gains. The relationship between the count value and the gain indicated by the gain output need not be linear or proportional.

The count value held by the counter 404 is incremented, decremented, or reset by way of the movement analyzer 402 and the crossing detector 403. With respect to the movement analyzer 402, this component acts to detect an operator request for speed change. In particular, a difference or derivative (delta) is taken of the desired speed (e.g., of signal 304) to measure movement of the operator control lever 302. Although some trivial movement of the operator control lever 302 due to vibration and slack or play are not indicative of a speed change command, more substantial displacements of the operator control lever 302 may signal a speed change.

In an embodiment, to accommodate small unintentional movements of the operator control lever 302 while capturing larger changes, the absolute value of the speed command delta is compared to a predefined threshold delta value. If the absolute value of the speed command delta is less than the threshold delta value, then the movement analyzer 402 determines that the speed command is not changing, and thus enables (or maintains enabled) the counter 404. However, when the absolute value of the speed command delta is equal to or greater than the threshold delta value, then the movement analyzer 402 determines that the speed command is changing (the operator is intentionally and/or aggressively changing the position of the operator control lever 302). As a consequence, the movement analyzer 402 resets the counter 404, e.g., to zero, thus causing a high overall system gain and producing a more aggressive machine response.

With respect to the crossing detector 403, this component detects when the speed error changes sign, such as when the actual speed transitions from being lower than the desired speed to being higher than the desired speed, or when the actual speed transitions from being higher than the desired speed to being lower than the desired speed. Each time such a zero crossing is detected based on the actual speed input and the desired speed input, the crossing detector 403 increments the counter maintained by the counter 404, thereby decreasing gain.

In an embodiment, the gain modifier 400 further comprises a torque comparator 406. In this embodiment, the torque comparator 406 evaluates the derivative of the output torque command and compares the calculated derivative value to a predetermined threshold torque value. If the change in the torque command is greater than the predetermined threshold torque value and if the torque command derivative changes sign (compared to the prior value), then the torque comparator 406 increments the counter maintained by counter 404 to reduce the system gain. This is based on the assumption that system is oscillating around steady state if the torque command is large. However, in an alternative embodiment, if the system is already operating at its torque limit, as when an increased speed command is indicated by the operator control lever 302, then the torque comparator 406 does not increment the counter maintained by counter 404, and thus does not cause a decrease in gain.

The gain values that are adjusted as described above may include each of the P-, I- and D-gain values, or just one or two of these values. In addition, where multiple gains are adjusted by the process described herein, the nature of the adjustment to each gain may vary in extent. For example, the range of adjustment for the P-gain may be larger than the range of adjustment for the D-gain. In producing a gain value based on the current counter value, the gain scheduler 405 may produce a new gain value, a new gain value multiplier, a new gain value delta value, and so on, to provide a value usable to adjust the gain value. Moreover, the value produced by the gain scheduler 405 may be calculated via an algorithm, identified based on a mapping, table or linked list, etc.

In an optional embodiment, the crossing detector 403 or other component is configured to decrement the counter, increasing the gain of interest, when the speed error is beyond a predetermined error threshold. This adjustment to the counter assumes that the speed error is large and thus the operator expects aggressive operation. Thus the counter is decremented to get back to aggressive gains.

INDUSTRIAL APPLICABILITY

In general terms, the present disclosure sets forth a system and method for providing speed control in applications wherein an operator speed command is translated to a torque command to actuate the element in question, e.g., an electrically-driven swing platform of an excavator or hydraulically powered drive elements propelling an earth-moving machine. As noted above, the disclosed principles find application more generally in a wide array of machines and machine functions, including but not limited to implement drive, machine drive, industrial equipment drive or actuation, earth-moving machines, such as wheel loaders, excavators, dump trucks, backhoes, motor graders, material handlers, locomotives, paving machines and so on.

Figure 5:
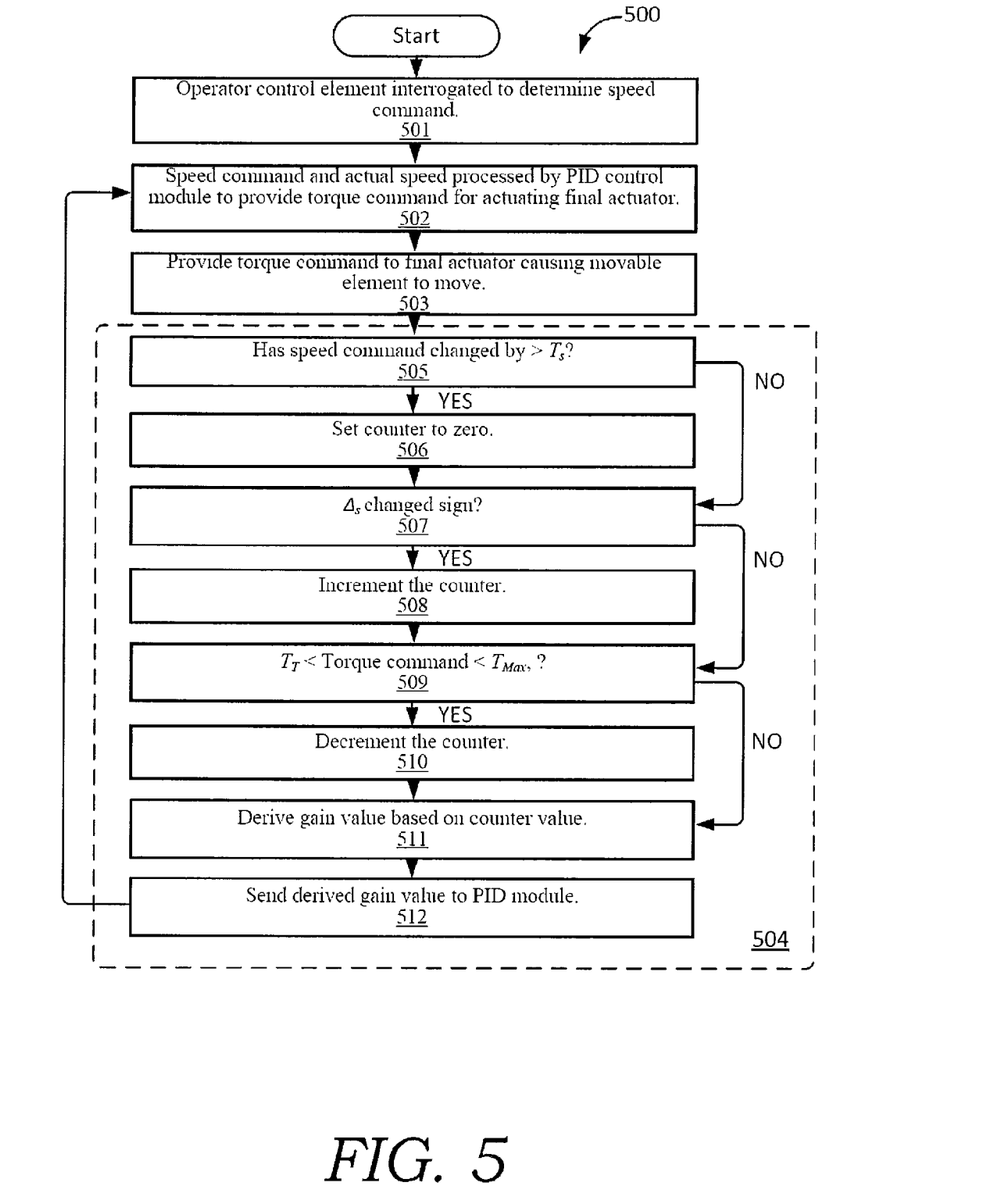
FIG. 5 is a flow chart illustrating a speed control process in a system wherein an operator speed command from an operator control element, such as a control stick, is implemented at a movable element such as a swing platform, via a torque-commanded actuator, such as an electric motor.

Referring now to FIG. 5, this figure provides a flow chart illustrating a control process 500 yielding speed control in system wherein an operator speed command from an operator control element, such as a control stick, is implemented at a movable element, e.g., a swing platform, via a final actuator, such as an electric motor. The original speed command and sensed speed are converted to a torque command by a PID control module incorporating a feedback loop to maintain the accuracy and stability of the system. The control process begins at stage 501, wherein the operator control element is sensed or interrogated to determine a speed command.

At stage 502, the speed command and actual speed are processed by the PID control module to provide a torque command for actuating the final actuator. At stage 503, the torque command is provided to the final actuator, causing the movable element to move. As the PID module functions, it applies various gains to its proportional, integral, and derivative elements. In this example, a single gain will be considered, but it will be appreciated that the same steps may be applied to each gain individually or that the process may be applied to all gains together.

At stage 504, a gain scheduler module or component analyzes the speed command and the resultant speed of the movable element and modifies the gain of the PID module accordingly to provide aggressive system response while maintaining system stability. Stage 505 is comprised of several substages including substages 505-512.

At substage 505, the gain scheduler determines whether the speed command compared to the prior speed command has changed by more than a predetermined speed threshold. The speed threshold may represent a change in the speed command itself or a change in the position of the operator control element. If it is determined that the speed command delta has changed by more than the predetermined speed threshold, the process 500 flows to substage 506, wherein the gain scheduler sets a counter to zero.

At substage 507, the gain scheduler evaluates the speed error, e.g., the difference between the speed indicated by the speed command and the actual speed exhibited by the movable element, and determines whether the speed error has changed sign since a prior evaluation. If it is determined that the speed error has changed sign, then the gain scheduler increments the counter at substage 508.

The gain scheduler next evaluates the torque command at substage 509 and in particular, evaluates the derivative of the output torque command and compares the calculated derivative value to a predetermined threshold torque value. If the change in the torque command is greater than the predetermined threshold torque value and if the torque command derivative changes sign (compared to the prior value), then the counter is incremented. If the counter value is already zero when a decrement request arrives, the counter may remain at zero.

At substage 511, the gain scheduler employs the counter value to derive a gain value, such as a P-gain. In an embodiment, as noted above, higher counter values yield lower gain values, and lower counter values yield higher gain values. As such, the system stability increases and responsiveness decreases and the count value rises. At substage 512, the gain scheduler sends the derived gain value to the PID module.

As noted above, the gain that is controlled and modified via this process 500 may be all, some or one of the P-gain, I-gain, and D-gain. In an embodiment, only the P-gain is controlled in the described manner, while the I-gain and D-gain are fixed or are controlled in another manner.

It will be appreciated that the present disclosure provides a new and useful speed control system for use in a variety of machines. While only certain embodiments have been set forth, alternatives and modifications will be apparent from the above description to those skilled in the art. These and other alternatives are considered equivalents and within the spirit and scope of this disclosure and the appended claims.

What is claimed is:

1. A speed control system for controlling a movable element in keeping with a speed command representing a desired speed, wherein control of the movable element is via an actuator responsive to a torque command, the speed control system comprising:
   a speed command input for receiving the speed command;
   a torque output for outputting the torque command;
   a speed input for receiving a sensed speed of the movable element;
   a PID control module configured to convert a speed error, representative of the difference between the desired speed and the sensed speed, to the torque command through a PID control process applying a set of gains including a P-gain, an I-gain, and a D-gain; and
   a gain modifier configured to increment or decrement a counter based on at least one of the speed command, the torque command and the sensed speed, and to provide at least one gain to the PID control module based on a value of the counter wherein the gain modifier is configured to determine that the speed command is constant and, in response, to enable the counter and is further configured to determine when the speed command is changing and, in response, to clear the counter.

2. The speed control system in accordance with claim 1, wherein the at least one gain has an inverse relationship to the value of the counter.

3. The speed control system in accordance with claim 1, wherein the at least one gain consists of a single gain.

4. The speed control system in accordance with claim 3, wherein the single gain comprises the P-gain.

5. The speed control system in accordance with claim 1, wherein the movable element is a movable structure attached to an earth-working machine.

6. The speed control system in accordance with claim 5, wherein the movable structure is an excavator swing platform and the actuator is an electric motor.

7. The speed control system in accordance with claim 1, wherein the movable element is a drive structure attached to an earth-working machine.

8. The speed control system in accordance with claim 7, wherein the drive structure is a ground engaging element for propelling the machine, and wherein the actuator is a hydraulic drive motor.

9. The speed control system in accordance with claim 1, wherein the speed command is derived from an operator control stick.

10. The speed control system in accordance with claim 1, wherein the gain modifier is further configured to increment the counter each time a difference between the desired speed and the sensed speed changes sign.

11. The speed control system in accordance with claim 1, wherein the gain modifier is further configured to decrement the counter each time a change in the torque command is greater than a predetermined torque threshold but less than a maximum available torque.

12. An excavator having a speed-controlled swing platform having a speed sensor producing a signal indicative of sensed platform speed, an electric motor for driving the swing platform and an operator control for providing a speed command representing a desired speed to operate the swing platform, the excavator comprising:
  a controller configured to receive the speed command and the sensed speed and to generate a torque command to drive the electric motor based on a difference between the desired speed and the sensed speed;
  a PID control module associated with the controller and configured to convert the speed command to the torque command through PID control applying a set of gains including a P-gain, an I-gain, and a D-gain; and
  a gain modifier associated with the controller and configured to increment or decrement a counter based on at least one of the speed command, the torque command and the sensed speed, and to provide at least one gain to the PID control module based on a value of the counter wherein a high count value of the counter decreases the at least one gain compared to a low count value of the counter.

13. The excavator having a speed-controlled swing platform in accordance with claim 12, wherein the gain scheduler is configured to determine that the speed command is constant and, in response, to enable the counter.

14. The excavator having a speed-controlled swing platform in accordance with claim 13, wherein the gain modifier is further configured to determine when the speed command is changing and, in response, to clear the counter.

15. The excavator having a speed-controlled swing platform in accordance with claim 12, wherein the gain modifier is further configured to increment the counter each time a difference between the speed command and the sensed speed changes sign.

16. The excavator having a speed-controlled swing platform in accordance with claim 12, wherein the gain modifier is further configured to decrement the counter each time a change in the torque command during a predetermined period is greater than a predetermined torque threshold.

17. A method of speed control for controlling a movable element in accordance with a speed command, wherein control of the movable element is via an actuator responsive to a torque command, the method comprising:
  receiving the speed command representing a desired speed;
  generating a sensed speed of the movable element; and
  providing a torque output to the actuator via PID control based on a difference between the desired speed and the sensed speed, the PID control having a set of gains including a P-gain, an I-gain, and a D-gain, at least one of which is set based on a counter, wherein the counter is set, cleared, incremented, or decremented based on one or more of the speed command, the torque command and the sensed speed.

18. The method of speed control for controlling a movable element in accordance with claim 17, wherein the at least one gain has an inverse relationship to the value of the counter, the method further comprising:
  determining that the speed command is constant and, in response, enabling the counter;
  determining when the speed command is changing and, in response, clearing the counter;
  incrementing the counter each time a difference between the speed command and the sensed speed changes sign; and
  decrementing the counter each time a change in the torque command over a period of time is greater than a predetermined torque threshold but less than a maximum available torque.

\* \* \* \* \*